US011450846B2

(12) United States Patent
Park et al.

(10) Patent No.: US 11,450,846 B2
(45) Date of Patent: Sep. 20, 2022

(54) POSITIVE ELECTRODE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDES THE POSITIVE ELECTRODE MATERIAL

(71) Applicant: LG Chem, Ltd., Seoul (KR)

(72) Inventors: Young Uk Park, Daejeon (KR); Tae Gu Yoo, Daejeon (KR); Jin Tae Hwang, Daejeon (KR); Wang Mo Jung, Daejeon (KR); Sung Bin Park, Daejeon (KR)

(73) Assignee: LG Energy Solution, Ltd.

( * ) Notice: Subject to any disclaimer, the term of this patent is extended or adjusted under 35 U.S.C. 154(b) by 338 days.

(21) Appl. No.: 16/632,171

(22) PCT Filed: Sep. 21, 2018

(86) PCT No.: PCT/KR2018/011309
§ 371 (c)(1),
(2) Date: Jan. 17, 2020

(87) PCT Pub. No.: WO2019/078503
PCT Pub. Date: Apr. 25, 2019

(65) Prior Publication Data
US 2020/0235381 A1  Jul. 23, 2020

(30) Foreign Application Priority Data
Oct. 19, 2017 (KR) .................. 10-2017-0135881

(51) Int. Cl.
*H01M 4/36* (2006.01)
*C01G 51/00* (2006.01)
(Continued)

(52) U.S. Cl.
CPC ............ *H01M 4/364* (2013.01); *C01G 51/66* (2013.01); *C01G 53/50* (2013.01); *H01M 4/505* (2013.01);
(Continued)

(58) Field of Classification Search
CPC ........ C01G 51/00; C01G 51/66; C01G 53/00; C01G 53/50; C01P 2002/85;
(Continued)

(56) References Cited

U.S. PATENT DOCUMENTS

2006/0204845 A1  9/2006 Chang et al.
2006/0257745 A1  11/2006 Choi et al.
(Continued)

FOREIGN PATENT DOCUMENTS

CN  1581543 A   2/2005
CN  101587952 A  11/2009
(Continued)

OTHER PUBLICATIONS

International Search Report for Application No. PCT/KR2018/011309, dated Feb. 28, 2019, pp. 1-3.
(Continued)

*Primary Examiner* — Victoria H Lynch
(74) *Attorney, Agent, or Firm* — Lerner, David, Littenberg, Krumholz & Mentlik, LLP

(57) ABSTRACT

The present disclosure relates to a positive electrode material which includes a first positive electrode active material, and a second positive electrode active material in the form of a single particle, wherein an amount of lithium impurities on a surface of the second positive electrode active material is 0.14 wt % or less based on a total weight of the second positive electrode active material, and at least one of nickel, cobalt, and manganese included in the second positive electrode active material has a concentration gradient gradu-
(Continued)

ally changing from the center of the particle to a surface thereof, a method of preparing the positive electrode material, and a positive electrode for a lithium secondary battery and a lithium secondary battery which include the positive electrode material.

11 Claims, 9 Drawing Sheets

(51) Int. Cl.

| | | |
|---|---|---|
| *C01G 53/00* | (2006.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ....... *H01M 4/525* (2013.01); *H01M 10/0525* (2013.01); *C01P 2002/85* (2013.01); *C01P 2004/03* (2013.01); *C01P 2004/62* (2013.01); *H01M 2004/021* (2013.01); *H01M 2004/028* (2013.01)

(58) Field of Classification Search
CPC ............ C01P 2004/03; C01P 2004/62; H01M 10/052; H01M 10/0525; H01M 2004/021; H01M 2004/028; H01M 4/131; H01M 4/364; H01M 4/505; H01M 4/525; Y02E 60/10
See application file for complete search history.

(56) References Cited

U.S. PATENT DOCUMENTS

| | | |
|---|---|---|
| 2009/0068561 A1 | 3/2009 | Sun et al. |
| 2009/0181311 A1 | 7/2009 | Iwanaga et al. |
| 2010/0019208 A1 | 1/2010 | Choi et al. |
| 2013/0202966 A1 | 8/2013 | Yu et al. |
| 2014/0027670 A1 | 1/2014 | Sun et al. |
| 2014/0057163 A1 | 2/2014 | Bae et al. |
| 2014/0131616 A1 | 5/2014 | Sun et al. |
| 2014/0356713 A1 | 12/2014 | Sun et al. |
| 2015/0010819 A1 | 1/2015 | Lee et al. |
| 2015/0162598 A1 | 6/2015 | Kim et al. |
| 2016/0049648 A1 | 2/2016 | Noh et al. |
| 2016/0049649 A1 | 2/2016 | Noh et al. |
| 2016/0049650 A1 | 2/2016 | Noh et al. |
| 2016/0322633 A1 | 11/2016 | Kim et al. |
| 2016/0365570 A1 | 12/2016 | Han et al. |
| 2017/0092935 A1 | 3/2017 | Sun et al. |
| 2018/0145323 A1* | 5/2018 | Yoo ........................ H01M 4/131 |
| 2018/0212237 A1 | 7/2018 | Lee et al. |

FOREIGN PATENT DOCUMENTS

| | | | |
|---|---|---|---|
| CN | 102498598 | A | 6/2012 |
| CN | 105161710 | A | 12/2015 |
| CN | 105226270 | A | 1/2016 |
| CN | 105609759 | A | 5/2016 |
| CN | 107204461 | A | 9/2017 |
| JP | 2008234872 | A | 10/2008 |
| JP | 2009525578 | A | 7/2009 |
| JP | 2011105594 | A | 6/2011 |
| JP | 2013517599 | A | 5/2013 |
| JP | 2017154915 | A | 9/2017 |
| KR | 20060091486 | A | 8/2006 |
| KR | 20100109605 | A | 10/2010 |
| KR | 20110083383 | A | 7/2011 |
| KR | 101171734 | B1 | 8/2012 |
| KR | 20140018685 | A | 2/2014 |
| KR | 20140120752 | A | 10/2014 |
| KR | 20140130046 | A | 11/2014 |
| KR | 20150006283 | A | 1/2015 |
| KR | 20160127991 | A | 11/2016 |
| KR | 101682502 | B1 | 12/2016 |
| KR | 20160146056 | A | 12/2016 |
| KR | 20170103699 | A | 9/2017 |
| WO | 2006091019 | A1 | 8/2006 |
| WO | 2007139130 | A1 | 12/2007 |
| WO | 2011007750 | A1 | 1/2011 |

OTHER PUBLICATIONS

Extended European Search Report with Written Opinion for Application No. 18868976.4 dated May 7, 2020, 9 pages.
Search Report dated Dec. 5, 2021 from Office Action for Chinese Application No. 201880046859.2 dated Dec. 15, 2021. 3 pgs.

* cited by examiner

POSITIVE ELECTRODE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDES THE POSITIVE ELECTRODE MATERIAL

CROSS-REFERENCE TO RELATED APPLICATIONS

The present application is a national phase entry under 35 U.S.C. § 371 of International Application No. PCT/KR2018/011309 filed Sep. 21, 2018, the disclosure of which is incorporated herein in its entirety by reference, which is claims the benefit of Korean Patent Application No. 10-2017-0135881, filed on Oct. 19, 2017, in the Korean Intellectual Property Office, the disclosure of which is incorporated herein in its entirety by reference.

TECHNICAL FIELD

The present disclosure relates to a positive electrode material for a lithium secondary battery, a method of preparing the positive electrode material, a positive electrode for a lithium secondary battery including the positive electrode material, and a lithium secondary battery including the positive electrode.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In recent years, research to increase capacity of the lithium secondary battery and reduce charge/discharge time has been actively conducted.

A constant current (CC) method, in which charging is performed at a constant current from an initial stage of charge to completion of charge, a constant voltage (CV) method, in which charging is performed at a constant voltage from the initial stage of charge to the completion of charge, and a constant current-constant voltage (CC-CV) method, in which charging is performed at a constant current during the initial stage of charge and charging is performed at a constant voltage at the end of charge, have been used as a conventional battery charging method. The constant current method is advantageous in that a large current flows due to a large voltage difference at the initial stage of charge, and the larger the charge current is, the shorter the charge time is, but the constant current method has limitations in that charge efficiency is reduced and lifetime of the battery is reduced when charging is performed with a large charge current. Also, the constant voltage method has limitations in that, when charging of the battery is completed, a terminal voltage greatly changes due to a change in temperature and heat generation of the battery so that it is difficult to set a constant voltage value in advance, and, accordingly, the charge time is increased.

Thus, currently the most widely used charging method is the constant current-constant voltage method. It is a method which prevents overcharge by charging the battery with a constant current when the battery is highly discharged and charging the battery at a constant voltage when charging is almost completed.

Lithium transition metal composite oxides have been widely used as a positive electrode active material of a conventional lithium secondary battery, and, among these oxides, since a lithium cobalt composite metal oxide, such as $LiCoO_2$, may have a high operating voltage and may react even at a high current due to effective deintercalation of lithium ions during fast charging, it may provide a positive electrode having excellent charge efficiency. However, since the $LiCoO_2$ has poor thermal properties due to an unstable crystal structure caused by the lithium deintercalation and, particularly, cobalt is expensive, there is a limitation in using a large amount of the $LiCoO_2$ as a power source for applications such as electric vehicles. Also, since the $LiCoO_2$ quickly reaches an upper limit voltage when the $LiCoO_2$ is fast charged at 1.0 C-rate or more by using the constant current-constant voltage method, there is a limitation in that the charge time is increased while a ratio of a CV charging section is increased.

Thus, there is a need to develop a positive electrode material which has excellent thermal properties while improving price competitiveness and may reduce the charge time by reducing the ratio of the CV charging section during fast charging at 1.0 C-rate or more.

DISCLOSURE OF CERTAIN EMBODIMENTS OF THE PRESENT DISCLOSURE

Technical Problem

An aspect of the present disclosure provides a positive electrode material for a lithium secondary battery which may reduce fast charging time during fast charging at a low cost.

Another aspect of the present disclosure provides a method of preparing the positive electrode material.

Another aspect of the present disclosure provides a positive electrode for a lithium secondary battery including the positive electrode material.

Another aspect of the present disclosure provides a lithium secondary battery which includes the positive electrode for a lithium secondary battery, has excellent high-temperature performance, and may reduce charge time during fast charging.

Technical Solution

According to an aspect of the present disclosure, there is provided a positive electrode material which includes a first positive electrode active material represented by Formula 1; and a second positive electrode active material in the form of a single particle which is represented by Formula 2, wherein an amount of lithium impurities on a surface of the second positive electrode active material is 0.14 wt % or less based on a total weight of the second positive electrode active material, and at least one of nickel (Ni), cobalt (Co), and manganese (Mn) included in the second positive electrode active material has a concentration gradient gradually changing from the center of the particle to a surface thereof:

$LiCo_{1-a}M^1{}_aO_2$  [Formula 1]

$LiNi_bCo_cMn_dM^2{}_eO_2$  [Formula 2]

wherein, in Formula 1, $M^1$ includes at least one selected from the group consisting of aluminum (Al), titanium (Ti), magnesium (Mg), and zirconium (Zr), and $0 \le a \le 0.2$, and wherein, in Formula 2, $M^2$ includes at least one selected from the group consisting of Al, Ti, Mg, Zr, yttrium (Y), strontium (Sr), and boron (B), and $0<b\leq 0.6$, $0<c\leq 0.35$, $0<d\leq 0.35$, and $0\leq e\leq 0.1$.

According to another aspect of the present disclosure, there is provided a method of preparing a positive electrode material which includes preparing a first positive electrode active material represented by Formula 1 by mixing and sintering a cobalt oxide, a lithium-containing raw material, and a doping element $M^1$-containing raw material; preparing a second positive electrode active material in the form of a single particle, which is represented by Formula 2, by sintering a nickel cobalt manganese hydroxide precursor having a core-shell structure and a lithium-containing raw material at 900° C. or more; and mixing the first positive electrode active material and the second positive electrode active material, wherein at least one of nickel, cobalt, and manganese in the second positive electrode active material has a concentration gradient gradually changing from the center of the particle to a surface thereof:

$$LiCo_{1-a}M^1_aO_2 \qquad \text{[Formula 1]}$$

$$LiNi_bCo_cMn_dM^2_eO_2 \qquad \text{[Formula 2]}$$

wherein, in Formula 1, $M^1$ includes at least one selected from the group consisting of Al, Ti, Mg, and Zr, and $0\leq a\leq 0.2$, and wherein, in Formula 2, $M^2$ includes at least one selected from the group consisting of Al, Ti, Mg, Zr, Y, Sr, and B, and $0<b\leq 0.6$, $0<c\leq 0.35$, $0<d\leq 0.35$, and $0\leq e\leq 0.1$.

According to another aspect of the present disclosure, there is provided a positive electrode for a lithium secondary battery which includes the positive electrode material according to the present disclosure.

According to another aspect of the present disclosure, there is provided a lithium secondary battery including the positive electrode according to the present disclosure.

Advantageous Effects

According to certain aspects of the present disclosure, manufacturing costs of a positive electrode material may be reduced by mixing a first positive electrode active material including a lithium cobalt oxide and a second positive electrode active material including a lithium nickel cobalt manganese oxide and using the mixture. Particularly, since at least one of transition metals included in the second positive electrode active material has a concentration gradient gradually changing from the center of a particle to a surface thereof, output characteristics of the second positive electrode active material may be improved. A constant voltage (CV) charging section of the positive electrode material according to the present disclosure may be reduced due to excellent charge rate of the second positive electrode active material, and, accordingly, fast charging time may be reduced.

Also, since an amount of lithium impurities on a surface of the second positive electrode active material included in the positive electrode material is controlled to be 0.14 wt % or less based on a total weight of the second positive electrode active material and, simultaneously, the second positive electrode active material is over-sintered to prepare the second positive electrode active material in the form of a single particle, a second positive electrode active material having excellent durability against cracks may be prepared. Accordingly, swelling characteristics and high-temperature storage characteristics of the positive electrode material including the second positive electrode active material may be improved when operating at a high voltage of 4.3 V or more.

MODE FOR CARRYING OUT CERTAIN EMBODIMENTS OF THE PRESENT DISCLOSURE

Figure 1:
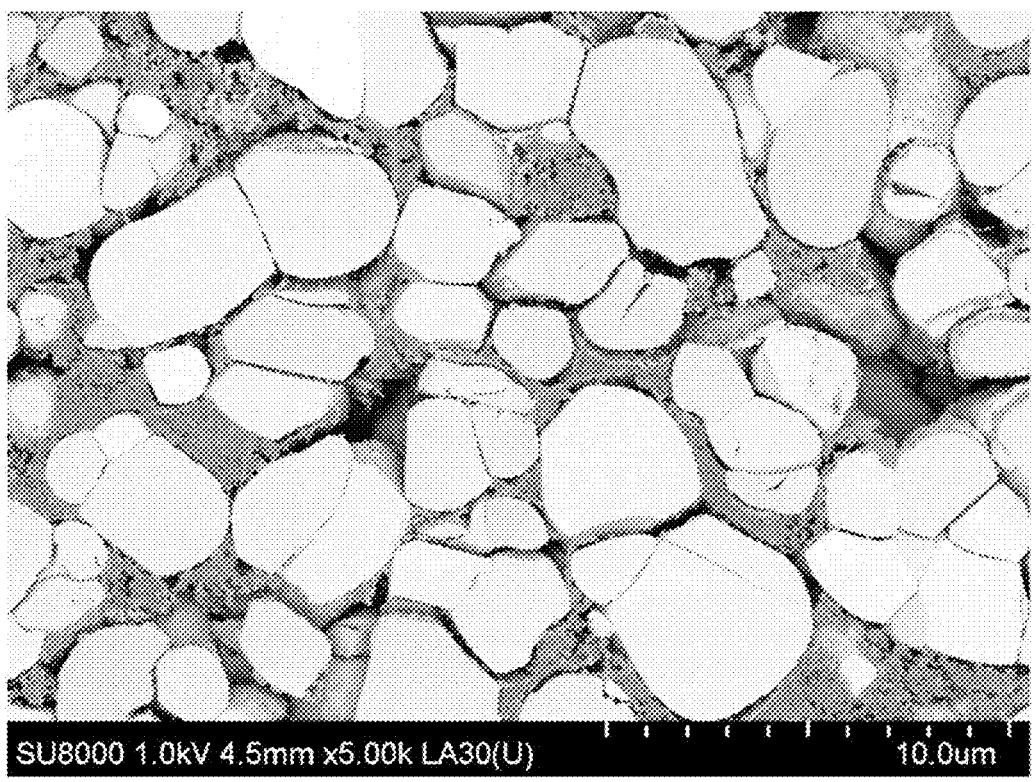
FIG. 1 is a high-magnification scanning electron microscope (SEM) image of a second positive electrode active material prepared in Example 1 of the present disclosure.

Hereinafter, the present disclosure will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the present disclosure, based on the principle that an inventor may properly define the meaning of the words or terms to best explain the present disclosure.

Lithium cobalt oxide has been studied as a positive electrode material of a conventional lithium secondary battery. However, in a case in which the lithium cobalt oxide is fast charged at 1 C-rate or more by using a constant current-constant voltage method, since the lithium cobalt oxide quickly reaches an upper limit voltage, there is a limitation in that charge time is increased while a ratio of a constant voltage (CV) charging section is increased.

Thus, the present inventors found that, since the lithium cobalt oxide is mixed with a lithium nickel cobalt manganese oxide in the form of a single particle in an appropriate ratio and used, but an amount of residual lithium on a surface of the lithium nickel cobalt manganese oxide is controlled and the second positive electrode active material has a concentration gradient gradually changing from the center of the particle to a surface thereof, manufacturing costs of a secondary battery is reduced and the ratio of the CV charging section is reduced during fast charging, and thus, a lithium secondary battery having improved swelling characteristics and high-temperature storage characteristics at high voltage may be prepared while reducing the charge time, thereby leading to the completion of the present disclosure.

When described in more detail, a positive electrode active material according to one embodiment of the present disclosure includes a first positive electrode active material including a lithium cobalt oxide and a second positive electrode active material including a lithium nickel cobalt manganese oxide in the form of a single particle, wherein an amount of lithium impurities on a surface of the second positive electrode active material is 0.14 wt % or less based on a total weight of the second positive electrode active material and at least one of nickel, cobalt, and manganese included in the second positive electrode active material has a concentration gradient gradually changing from the center of the particle to a surface thereof.

Specifically, continuing with this exemplary embodiment, the first positive electrode active material may be represented by Formula 1 below:

$$LiCo_{1-a}M^1{}_aO_2 \quad \text{[Formula 1]}$$

in Formula 1, $M^1$ includes at least one selected from the group consisting of aluminum (Al), titanium (Ti), magnesium (Mg), and zirconium (Zr), and $0 \leq a \leq 0.2$.

Since the first positive electrode active material is easily mass-produced due to easy preparation, has a high operating voltage, and has excellent capacity characteristics, the first positive electrode active material may exhibit stable life characteristics and output characteristics at high voltage.

The first positive electrode active material may include doping element $M^1$, and, in this case, structural stability of the first positive electrode active material may be improved. For example, the first positive electrode active material may include the doping element $M^1$ in an amount of 100 ppm to 10,000 ppm, for example, 500 ppm to 5,000 ppm based on a total weight of the first positive electrode active material. In a case in which the doping element $M^1$ is included in an amount within the above range, the structural stability improvement effect may be further improved. Preferably, the first positive electrode active material may include $LiCoO_2$ or may include at least one doping element, for example, at least two doping elements selected from the group consisting of Al, Ti, and Mg. For example, the first positive electrode active material may include $LiCo_{0.988}Ti_{0.004}Mg_{0.004}Al_{0.004}O_2$.

Also, the first positive electrode active material may further include a coating layer including at least one coating element selected from the group consisting of Al, Ti, Mg, and Zr. For example, since the first positive electrode active material further includes the coating layer, a contact between the first positive electrode active material and an electrolyte solution included in a lithium secondary battery is blocked by the coating layer, the generation of a side reaction is suppressed, and thus, an effect of improving life characteristics may be achieved when used in the battery.

An amount of the coating element in the coating layer may be in a range of 100 ppm to 10,000 ppm, preferably 100 ppm to 5,000 ppm, and more preferably 200 ppm to 2,000 ppm based on the total weight of the first positive electrode active material. For example, in a case in which the coating element is included in an amount within the above range, since the effect of suppressing the generation of the side reaction may be more effective, the life characteristics may be further improved when used in the battery.

The coating layer may be formed on an entire surface of the first positive electrode active material or may be partially formed. Specifically, in a case in which the coating layer is partially formed on the surface of the first positive electrode active material, the coating layer may be formed in an area of 20% or more to less than 100% of a total surface area of the first positive electrode active material.

The first positive electrode active material may have an average particle diameter ($D_{50}$) of 10 μm or more, preferably 10 μm to 20 μm, and more preferably 10 μm to 18 μm. In a case in which the average particle diameter ($D_{50}$) of the first positive electrode active material is 10 μm or more, high rolling density may be achieved.

The average particle diameter ($D_{50}$) of the first positive electrode active material may be defined as a particle diameter corresponding to 50% of the cumulative number of particles in a particle diameter distribution curve of the particles. For example, the average particle diameter ($D_{50}$) of the first positive electrode active material may be measured by using a laser diffraction method. The laser diffraction method may generally measure a particle diameter ranging from a submicron level to a few mm, and may obtain highly repeatable and high resolution results. For example, in the measurement method of the average particle diameter ($D_{50}$) of the first positive electrode active material, the first positive electrode active material is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

In one embodiment of the present disclosure, the second positive electrode active material is in the form of a single particle, at least one of nickel, cobalt, and manganese has a concentration gradient gradually changing from the center of the particle to a surface thereof, and the second positive electrode active material may be represented by Formula 2 below:

$$LiNi_bCo_cMn_dM^2{}_eO_2 \quad \text{[Formula 2]}$$

in Formula 2, $M^2$ includes at least one selected from the group consisting of Al, Ti, Mg, Zr, yttrium (Y), strontium (Sr), and boron (B), and $0<b\leq 0.6$, $0<c\leq 0.35$, $0<d\leq 0.35$, and $0\leq e\leq 0.1$.

In the present disclosure, the expression 'is in the form of a single particle' denotes that a secondary particle, in which primary particles of the second positive electrode active material are agglomerated, is formed into a single particle by over-sintering, and, in this case, the particle in the form of a single particle may include polycrystal in the single particle.

In the present disclosure, the expression 'metal has a gradually changing concentration gradient' denotes that the metal has a concentration distribution in which the concentration of the metal is continuously and stepwise changed across the entire particle or in a specific region.

Specifically, a concentration of nickel included in the second positive electrode active material may be constantly maintained from the center of the second positive electrode active material particle to the surface of the particle. In a case in which the nickel is maintained in a high concentration of 50 mol % or more based on a total amount of moles of transition metals excluding lithium, the second positive electrode active material including the same may exhibit high capacity characteristics.

Also, a concentration of manganese included in the positive electrode active material may have a concentration gradient gradually decreasing from the center of the second positive electrode active material particle to the surface thereof. In a case in which the manganese has a concentration gradient in which a high concentration of the manganese is maintained at the center of the second positive electrode active material particle and the concentration is decreased from the center of the particle to a surface portion, structural stability and resistance characteristics of the particles of the second positive electrode active material including the same may be improved.

In addition, a concentration of cobalt included in the positive electrode active material may be inversely proportional to the concentration of the manganese, and, specifically, may have a concentration gradient gradually increasing from the center of the second positive electrode active material particle to the surface thereof. In a case in which the cobalt has a concentration gradient in which the concentration of the cobalt is increased from the center of the second positive electrode active material particle to the surface portion, output characteristics of the second positive electrode active material including the same may be improved.

In a case in which an amount of the manganese is decreased and an amount of the cobalt is increased from the center of the second positive electrode active material particle to the surface thereof, since the structural stability, resistance characteristics, and output characteristics of the second positive electrode active material are improved, fast-charging characteristics may be improved.

In a case in which the second positive electrode active material is in the form of a single particle, the second positive electrode active material does not break or crack even if a positive electrode material including the same is rolled. This may lead to an improvement in charge and discharge efficiency of the positive electrode material, and, accordingly, a side reaction between the positive electrode material and the electrolyte solution may be reduced. As a result, since durability against changes in volume during charge and discharge of the battery using the same is improved, high-temperature performance may be improved.

Also, the amount of lithium impurities on the surface of the second positive electrode active material is included in a range of 0.14 wt % or less, for example, 0.01 wt % to 0.10 wt % based on the total weight of the second positive electrode active material. For example, the lithium impurities may include LiOH and $LiCO_3$. The lithium impurities on the surface of the second positive electrode active material may be formed by a side reaction between the electrolyte solution and an excessive amount of lithium ions present on the surface of the second positive electrode active material during the charge and discharge of the battery. In a case in which the amount of the lithium impurities on the surface of the second positive electrode active material satisfies the above range, this may denote that the side reaction between the electrolyte solution and the excessive amount of lithium ions present on the surface of the second positive electrode active material is suppressed, and, accordingly, a swelling phenomenon of the battery, which may occur during the side reaction between the electrolyte solution and the lithium ions, may also be suppressed. Furthermore, in the case that the amount of the lithium impurities on the surface of the second positive electrode active material satisfies the above range, surface stability of the second positive electrode active material may be improved to improve thermal stability, and, as a result, high-temperature storage performance may be improved.

For example, in a case in which the amount of the lithium impurities on the surface is greater than 0.14 wt % based on the total weight of the second positive electrode active material, the swelling phenomenon of the battery may occur due to the side reaction between the electrolyte solution and the lithium ions, and the surface stability of the second positive electrode active material may be reduced to reduce the thermal stability and high-temperature storage performance.

The amount of the lithium impurities on the surface of the second positive electrode active material may be measured by titrating a solution, in which 5±0.01 g of 0.1 N HCl and 100 g of distilled water are stirred for 5 minutes and filtered, using a Metrohm pH meter until pH drops to 4 or less. Type and concentration of the acid used for the titration and reference pH may be appropriately changed as needed.

In addition, the second positive electrode active material may further include a coating layer including at least one coating element selected from the group consisting of Al, Ti, Mg, Zr, Y, Sr, and B. For example, since a contact between the second positive electrode active material and the electrolyte solution included in the lithium secondary battery is blocked by the coating layer to suppress the generation of the side reaction, the life characteristics may be improved when used in the battery and, in addition, packing density of the positive electrode active material may be increased.

In a case in which the coating element is further included as described above, an amount of the coating element in the coating layer may be in a range of 100 ppm to 10,000 ppm, for example, 200 ppm to 5,000 ppm based on the total weight of the second positive electrode active material. For example, in a case in which the coating element is included in an amount within the above range based on the total weight of the second positive electrode active material, since the effect of suppressing the generation of the side reaction may be more effective, the life characteristics may be further improved when used in the battery.

The coating layer may be formed on an entire surface of the second positive electrode active material or may be partially formed. Specifically, in a case in which the coating layer is partially formed on the surface of the second positive electrode active material, the coating layer may be formed in an area of 20% or more to less than 100% of a total surface area of the second positive electrode active material.

The second positive electrode active material may have an average particle diameter ($D_{50}$) of 5 μm to 10 μm, for example, 5 μm to 8 μm. In a case in which the average particle diameter ($D_{50}$) of the second positive electrode active material satisfies the above range, the high-temperature performance may be improved and cracks may not occur during rolling of an electrode.

The average particle diameter ($D_{50}$) of the second positive electrode active material may be defined as a particle diameter at 50% in a cumulative particle diameter distribution, and the average particle diameter of the second positive electrode active material may be measured by using the same method as that used to measure the average particle diameter of the first positive electrode active material.

The second positive electrode active material may have a grain size of 200 nm to 500 nm. In a case in which the grain size of the second positive electrode active material satisfies the above range, since both tap density and pellet density are increased while pores between the second positive electrode active material particles are reduced, rolling density of the second positive electrode active material may be further increased, and, in this case, energy density per volume of the second positive electrode active material may be improved.

The grain size of the second positive electrode active material may be measured using an X-ray diffraction (XRD) analyzer.

In various embodiments of the present disclosure, the positive electrode material includes both of the first positive electrode active material and the second positive electrode active material, may preferably include the first positive electrode active material and the second positive electrode active material in a weight ratio of 40:60 to 90:10, and may more preferably include the first positive electrode active material and the second positive electrode active material in a weight ratio of 50:50 to 80:20. Since the positive electrode material includes both of the first positive electrode active material and the second positive electrode active material to reduce charge resistance in comparison to when the first positive electrode active material is only included, the ratio of the CV charging section may be reduced, and thus, charge time of the lithium secondary battery may be reduced. Also, excellent high-temperature storage performance and rolling density may be achieved and, in this case, manufacturing costs may be also reduced. In this case, the charge resistance denotes a voltage value of a charge profile when charged with a high current of 1 C-rate or more.

For example, in a case in which the first positive electrode active material and the second positive electrode active material are included within the above ratio range, the CV charging section may be more easily reduced, and, accordingly, the charge time may be more reduced during fast charging.

Also, certain embodiments of the present disclosure provide a method of preparing a positive electrode material which includes: preparing a first positive electrode active material represented by the following Formula 1 by mixing and sintering a cobalt oxide, a lithium-containing raw material, and a doping element $M^1$-containing raw material; preparing a second positive electrode active material in the form of a single particle, which is represented by the following Formula 2, by sintering a nickel cobalt manganese hydroxide precursor having a core-shell structure and a lithium-containing raw material at 900° C. or more; and mixing the first positive electrode active material and the second positive electrode active material, wherein at least one of nickel, cobalt, and manganese in the second positive electrode active material has a concentration gradient gradually changing from the center of the particle to a surface thereof:

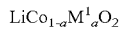
$$LiCo_{1-a}M^1_aO_2 \quad \text{[Formula 1]}$$

$$LiNi_bCo_cMn_dM^2_eO_2 \quad \text{[Formula 2]}$$

wherein, in Formula 1, $M^1$ includes at least one selected from the group consisting of Al, Ti, Mg, and Zr, and $0 \leq a \leq 0.2$, and, in Formula 2, $M^2$ includes at least one selected from the group consisting of Al, Ti, Mg, Zr, Y, Sr, and B, and $0 < b \leq 0.6$, $0 < c \leq 0.35$, $0 < d \leq 0.35$, and $0 \leq e \leq 0.1$.

In order to prepare the positive electrode material according to the present disclosure, a first positive electrode active material represented by Formula 1 is first prepared.

The preparing of the first positive electrode active material may be performed by using a conventional solid-phase method, and, specifically, a cobalt oxide, a lithium-containing raw material, and a doping element $M^1$-containing raw material are mixed and sintered at 900° C. to 1,100° C. to prepare the first positive electrode active material represented by Formula 1.

For example, the cobalt oxide may include at least one selected from the group consisting of $Co_3O_4$, CoOOH, and $Co(OH)_2$.

For example, the lithium-containing raw material is not particularly limited as long as it is a compound including a lithium source, but at least one selected from the group consisting of lithium carbonate ($Li_2CO_3$), lithium hydroxide (LiOH), $LiNO_3$, $CH_3COOLi$, and $Li_2(COO)_2$ may preferably be used.

The cobalt oxide and the lithium-containing raw material may be mixed in a molar ratio of 1:1.0 to 1:1.10, for example, 1:1.02 to 1:1.08. In a case in which the cobalt oxide and the lithium-containing raw material are mixed in a molar ratio within the above range, the positive electrode active material prepared may exhibit excellent capacity.

The lithium-containing raw material may be determined according to amounts of lithium and metal (Co) in the finally prepared positive electrode active material, and the lithium-containing raw material may preferably be used in an amount such that a molar ratio of lithium included in the lithium-containing raw material to cobalt included in the cobalt oxide (molar ratio of Li/Co) is 1.00 or more, for example, 1.02 to 1.08. In a case in which the molar ratio of the lithium-containing raw material to the cobalt oxide satisfies the above range, the positive electrode active material prepared may exhibit excellent capacity.

The doping element $M^1$-containing raw material may be included in an amount of 100 ppm to 10,000 ppm, for example, 100 ppm to 5,000 ppm based on a total combined weight of the cobalt oxide and the lithium-containing raw material. Since the doping element $M^1$-containing raw material is included in an amount within the above range, surface resistance may be increased, the deintercalation rate of the lithium ions may be reduced, and effects of improving structural stability and lifetime of the battery prepared by using the same may be achieved. For example, the doping element $M^1$-containing raw material may include at least one metallic element selected from the group consisting of Al, Ti, Mg, and Zr. Preferably, the doping element $M^1$-containing raw material may include at least one selected from the group consisting of $Al_2O_3$, $TiO_2$, MgO, and $ZrO_2$.

The cobalt oxide, the lithium-containing raw material, and the doping element $M^1$-containing raw material may be sintered in a temperature range of 900° C. to 1,100° C., for example, 950° C. to 1,080° C. In a case in which the sintering temperature satisfies the above range, since the raw materials may not remain in the particles, high-temperature stability of the battery may be improved and, accordingly, bulk density and crystallinity are improved. As a result, structural stability of the first positive electrode active material may be improved. Also, since the particles of the positive electrode active material may uniformly grow, volume capacity of the battery may be improved.

The sintering of the cobalt oxide, the lithium-containing raw material, and the doping element $M^1$-containing raw material may be performed for 2 hours to 24 hours, for example, 5 hours to 12 hours. In a case in which the sintering time satisfies the above range, a highly crystalline first positive electrode active material may be obtained, and production efficiency may also be improved.

The first positive electrode active material is prepared, and the second positive electrode active material in the form of a single particle, which is represented by Formula 2, is prepared by sintering a nickel cobalt manganese hydroxide precursor having a core-shell structure and a lithium-containing raw material at 900° C. or more. In this case, at least one of nickel, cobalt, and manganese in the second positive electrode active material may have a concentration gradient gradually changing from the center of the particle to the surface thereof.

Specifically, a nickel cobalt manganese hydroxide precursor is prepared in order to prepare the second positive electrode active material. The nickel cobalt manganese hydroxide precursor may be prepared by including the steps of: preparing a first transition metal-containing solution including nickel, cobalt, and manganese and a second transition metal-containing solution including nickel, cobalt, and manganese in a concentration different from that of the first transition metal-containing solution; and mixing the first transition metal-containing solution and the second transition metal-containing solution such that a mixing ratio of the first transition metal-containing solution to the second transition metal-containing solution is gradually changed from 100 vol %:0 vol % to 0 vol %:100 vol % and adding an ammonium ion-containing solution and a basic aqueous solution at the same time, wherein at least one of the nickel, the cobalt, and the manganese has a concentration gradient gradually changing from the center of the particle to the surface thereof.

In another embodiment, to provide some additional detail of a method of preparing the nickel cobalt manganese hydroxide precursor, a first transition metal-containing solution and a second transition metal-containing solution are first prepared.

The first transition metal-containing solution may be prepared by adding a nickel raw material, a cobalt raw material, and a manganese raw material to a solvent, particularly water, or a mixture of water and an organic solvent (alcohol etc.) which may be uniformly mixed with the water, or aqueous solutions including each of the metal-containing raw materials are prepared and these solutions may then be mixed and used.

The second transition metal-containing solution includes a nickel raw material, a cobalt raw material, and a manganese raw material, and may be prepared in the same manner as the first transition metal-containing solution.

As the nickel, cobalt, and manganese raw materials, an each metallic element-containing sulfate, nitrate, acetic acid salt, halide, hydroxide, or oxyhydroxide may be used, and the nickel, cobalt, and manganese raw materials are not particularly limited as long as the raw materials may be dissolved in the above-described solvent such as water.

Specifically, the cobalt raw material may include at least one selected from the group consisting of $Co(OH)_2$, CoOOH, $CoSO_4$, $Co(OCOCH_3)_2 \cdot 4H_2O$, $Co(NO_3)_2 \cdot 6H_2O$, and $Co(SO_4)_2 \cdot 7H_2O$.

Also, the nickel raw material may include at least one selected from the group consisting of $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide.

Furthermore, the manganese raw material may include at least one selected from the group consisting of a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride.

Subsequently, a nickel cobalt manganese hydroxide precursor, in which at least one of the nickel, cobalt, and manganese has a concentration gradient gradually changing from the center of the particle to the surface thereof, is prepared by a co-precipitation reaction by mixing the first transition metal-containing solution and the second transition metal-containing solution such that a mixing ratio of the first transition metal-containing solution to the second transition metal-containing solution is gradually changed from 100 vol %:0 vol % to 0 vol %:100 vol % and adding an ammonium ion-containing solution and a basic aqueous solution at the same time.

Since a reaction (particle nucleation and particle growth) is performed in a state in which the first transition metal-containing solution is only present at an early stage of the preparing of the nickel cobalt manganese hydroxide precursor, precursor particles first prepared have a composition of the first transition metal-containing solution. Thereafter, since the second transition metal-containing solution is gradually mixed with the first transition metal-containing solution, the composition of the precursor particle is also gradually changed to a composition of the second transition metal-containing solution from the center of the precursor particle in an outward direction.

Thus, the compositions of the first transition metal-containing solution and the second transition metal-containing solution and the mixing rate and ratio thereof are adjusted to control the concentration gradients of the metallic elements in the precursor and their slopes so that a desired position from the center of the precursor particle toward the surface has a desired composition. Preferably, the second transition metal-containing solution may be used in which an amount of manganese is lower than that in the first transition metal-containing solution and complementarily, an amount of cobalt is higher than that in the first transition metal-containing solution. In a case in which, in the second transition metal-containing solution, the amount of manganese is lower and the amount of cobalt is higher than that in the first transition metal-containing solution as described above, a nickel cobalt manganese hydroxide precursor may be prepared in which the amount of manganese of a surface portion of the particle is lower than that of the center of the particle and the amount of cobalt of the surface portion of the particle is higher than that of the center of the particle. In a case in which the above-described nickel cobalt manganese hydroxide precursor, in which the amount of manganese of the surface portion of the particle is lower and the amount of cobalt of the surface portion of the particle is higher than that of the center of the particle, is used to prepare a lithium transition metal oxide, since the structural stability, resistance characteristics, and output characteristics of the second positive electrode active material are improved, fast charging characteristics may be improved.

Also, the mixing of the first transition metal-containing solution and the second transition metal-containing solution is continuously performed, and precipitates having a concentration gradient, in which the concentration of the metal is continuous from the center of the particle toward the surface thereof, may be obtained by continuously supplying the second transition metal-containing solution and performing a reaction, wherein the concentration gradient of the metal in the active material precursor formed in this case may be easily adjusted by the compositions of the first transition metal-containing solution and the second transition metal-containing solution and a mixed feed ratio.

Furthermore, the concentration gradient of the metallic element in the particle may be formed by controlling reaction rate or reaction time. In order to produce a high density state in which the concentration of the specific metal is high, it is desirable to increase the reaction time and decrease the reaction rate, and, in order to produce a low density state in which the concentration of the specific metal is low, it is desirable to decrease the reaction time and increase the reaction rate.

Also, the ammonium ion-containing solution may include at least one selected from the group consisting of $NH_4OH$, $(NH_4)_2SO_4$, $NH_4NO_3$, $NH_4Cl$, $CH_3COONH_4$, and $NH_4CO_3$. In this case, water or a mixture of water and an organic solvent (specifically, alcohol etc.), which may be uniformly mixed with the water, may be used as a solvent.

Furthermore, the basic aqueous solution may include at least one selected from the group consisting of NaOH, KOH, and $Ca(OH)_2$, and water or a mixture of water and an organic solvent (specifically, alcohol etc.), which may be uniformly mixed with the water, may be used as a solvent.

For example, an average composition of the nickel cobalt manganese hydroxide precursor prepared by the above-described preparation method may be represented by the following Formula 3:

$$Ni_{b1}Co_{c1}Mn_{d1}(OH)_2 \qquad \text{[Formula 3]}$$

in Formula 3, $0<b1 \leq 0.6$, $0<c1 \leq 0.35$, and $0<d1 \leq 0.35$.

The second positive electrode active material in the form of a single particle may be prepared by high-temperature sintering the nickel cobalt manganese hydroxide precursor having an average composition represented by Formula 3 and the lithium-containing raw material in a temperature range of 900° C. or more, for example, 900° C. to 1,100° C. as in the present disclosure. In a case in which the sintering temperature satisfies the above range, the grain size of the second positive electrode active material may be increased and the amount of the lithium impurities on the surface of the second positive electrode active material may be reduced. Also, at least one of the nickel, cobalt, and manganese in the second positive electrode active material may have a concentration gradient gradually changing from the center of the particle to the surface thereof by using the nickel cobalt manganese hydroxide precursor. Preferably, the second positive electrode active material may have a concentration gradient in which the amount of manganese is gradually decreased from the center of the particle to the surface thereof and, complementarily, the amount of cobalt is gradually increased.

For example, in a case in which the nickel cobalt manganese hydroxide precursor having a core-shell structure and the lithium-containing raw material are sintered at a temperature of less than 900° C., the second positive electrode active material is present not in the form of a single particle, but in the form of a secondary particle in which primary particles are agglomerated. In a case in which the second positive electrode active material is not in the form of a single particle, but in the form of a secondary particle, mobility of the lithium ions included in the second positive electrode active material is improved, but, in a case in which a pressure is applied to the second positive electrode active material, since cracks may occur in the second positive electrode active material particles, the particles may easily break even at a low pressure. A contact surface between the electrolyte solution and the positive electrode material including the same is increased due to the decrease in durability of the second positive electrode active material, and, accordingly, the side reaction between the positive electrode material and the electrolyte solution may be increased. As a result, the battery may be expanded due to the generation of a large amount of gas during charge and discharge of the battery using the same.

During the sintering of the second positive electrode active material, the sintering may be performed by further selectively adding a doping element $M^2$-containing raw material in addition to the nickel cobalt manganese hydroxide precursor and the lithium-containing raw material, if necessary. As the doping element $M^2$-containing raw material, a sulfate, nitrate, acetic acid salt, halide, hydroxide, or oxyhydroxide containing at least one metallic element selected from the group consisting of Ti, Mg, Zr, Y, Sr, and B may be used, and the doping element $M^2$-containing raw material is not particularly limited as long as it may be dissolved in the above-described solvent such as water. In a case in which the second positive electrode active material further includes the doping element $M^2$-containing raw material, the structural stability of the second positive electrode active material may be improved.

For example, the nickel cobalt manganese hydroxide precursor having a core-shell structure and the lithium-containing raw material may be sintered for 2 hours to 24 hours, for example, 5 hours to 12 hours. In a case in which the sintering time satisfies the above range, a highly crystalline second positive electrode active material may be obtained, and production efficiency may also be improved.

In yet another embodiment, the first positive electrode active material and the second positive electrode active material may be mixed. In this case, the first positive electrode active material and the second positive electrode active material are mixed in a weight ratio of 40:60 to 90:10, for example, 50:50 to 80:20. The mixing is not particularly limited as long as it is a method capable of uniformly mixing the first positive electrode active material and the second positive electrode active material. The charge time of the lithium secondary battery may be reduced by mixing the first positive electrode active material and the second positive electrode active material in the above ratio, excellent high-temperature storage performance and rolling density may be achieved, and manufacturing costs may also be reduced.

Also, provided is a positive electrode for a lithium secondary battery including the positive electrode material according to one embodiment of the present disclosure. Specifically, provided is the positive electrode for a lithium secondary battery which includes a positive electrode collector and a positive electrode material layer formed on the positive electrode collector, wherein the positive electrode material layer includes the positive electrode material according to the present disclosure.

In this case, since the positive electrode material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode material layer may selectively include a binder as well as a conductive agent, if necessary, in addition to the above-described positive electrode material.

In this case, the positive electrode material may be included in an amount of 80 wt % to 99 wt %, for example, 85 wt % to 98.5 wt % based on a total weight of the positive electrode material layer. When the positive electrode material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode material layer.

The binder improves the adhesion between the positive electrode material particles and the adhesion between the positive electrode material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode material layer.

The positive electrode may be prepared according to a typical method of preparing a positive electrode except that the above-described positive electrode material is used. Specifically, a composition for forming a positive electrode material layer, which is prepared by dissolving or dispersing the positive electrode material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode material layer on a separate support and then laminating a film separated from the support on the positive electrode collector.

Furthermore, in another embodiment of the present disclosure, an electrochemical device including the positive electrode may be prepared. The electrochemical device may specifically be a battery or a capacitor, and, for example, may be a lithium secondary battery.

For example, the lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

Since the lithium secondary battery according to the present disclosure includes the positive electrode including the positive electrode material according to the present disclosure, fast charging may be possible. In this case, the fast charging denotes a method of charging a battery having a driving voltage of 3 V to 4.35 V at a high current of 1 C-rate or more, for example, 1 C-rate to 1.5 C-rate. For example, time required to reach a state of charge (SOC) of 80% when the battery is charged at a constant current of 1 C to a driving voltage of 4.35 V may be within 1.5 hours, for example, 50 minutes.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta\leq2)$, $SnO_2$, vanadium oxide, and lithium vanadium oxide; or a composite including the metallic compound and the carbonaceous material such as a Si-C composite or a Sn-C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

In another example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on thenegative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present disclosure is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, ε-caprolactone, γ-valerolactone, σ-valerolactone, dimethoxyethane, diethoxyethane, propyl acetate, methyl propionate, ethyl propionate, propyl propionate, and butyl propionate; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode material according to the present disclosure stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, the present disclosure will be described in detail, according to specific examples. The disclosure may, however, be embodied in many different forms and should not be construed as being limited to the embodiments set forth herein. Rather, these example embodiments are provided so that this description will be thorough and complete, and will fully convey the scope of the present disclosure to those skilled in the art.

EXAMPLES

Example 1

[First Positive Electrode Active Material Preparation]

100 g of $Co_3O_4$, 47 g of $Li_2CO_3$, 0.4069 g of $TiO_2$, 0.2825 g of $MgO_2$, and 0.2304 g of $Al_2O_3$ were solid-phase mixed by using ball milling and sintering was performed at 1,050° C. for 9 hours to prepare a Ti, Mg, and Al-doped lithium cobalt oxide ($LiCo_{0.988}Ti_{0.004}Mg_{0.004}Al_{0.004}O_2$) having an average particle diameter of 16 m.

[Second Positive Electrode Active Material Preparation]

$NiSO_4$, $CoSO_4$, and $MnSO_4$ were mixed in $H_2O$ in a 5 L batch-type reactor set at 60° C. in amounts such that a molar ratio of nickel:cobalt:manganese was 5:1:4 to prepare a first transition metal-containing solution with a concentration of 2M.

Also, $NiSO_4$, $CoSO_4$, and $MnSO_4$ were mixed in $H_2O$ in amounts such that a molar ratio of nickel:cobalt:manganese was 5:3:2 to prepare a second transition metal-containing solution with a concentration of 2M.

A container containing the first transition metal-containing solution and a container containing the second transition metal-containing solution were connected to the batch-type reactor. In addition, a 4M NaOH solution and a 7% $NH_4OH$ aqueous solution were prepared and connected to the batch-type reactor, respectively. 3 L of deionized water was put in a 5 L co-precipitation reactor, and the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0.

Thereafter, the first transition metal-containing solution and the second transition metal-containing solution were mixed such that a ratio of the first transition metal-containing solution and the second transition metal-containing solution was changed from 100 vol %:0 vol % to 0 vol %:100 vol %. The resulting mixed metal solution was continuously added to the co-precipitation reactor at a rate of 180 mL/min through a pipe for a mixed solution, the NaOH aqueous solution and the $NH_4OH$ aqueous solution were respectively added at rates of 180 mL/min and 10 mL/min, and a co-precipitation reaction was performed for 0.5 hours to precipitate particles of nickel manganese cobalt composite metal hydroxide. The particles of the precipitated nickel manganese cobalt composite metal hydroxide were separated, washed, and then dried in an oven at 120° C. for 12 hours to prepare a precursor for a second positive electrode active material having a core-shell structure.

The precursor thus obtained was dry-mixed with $LiOH \cdot H_2O$, as a lithium raw material, (1.04 mol of the lithium raw material relative to 1 mol of the precursor) and sintering was then performed at 990° C. for 9 hours to prepare a second positive electrode active material having an overall average composition of $LiNi_{0.5}Co_{0.2}Mn_{0.3}O_2$, and, in this case, the second positive electrode active material had a concentration gradient in which the amount of manganese was gradually decreasing from the center of the particle to the surface thereof.

[Positive Electrode Preparation]

96 parts by weight of a positive electrode material, 2 parts by weight of a Denka black conductive agent, and 2 parts by weight of a polyvinylidene fluoride (PVDF) binder were mixed in a N-methylpyrrolidone (NMP) solvent based on 100 parts by weight of a composition for forming a positive electrode, in which the above-prepared first positive electrode active material and second positive electrode active material were mixed in a weight ratio of 70:30, to prepare the composition for forming a positive electrode. A m thick aluminum foil was coated with the composition for forming a positive electrode, dried, and then roll-pressed to prepare a positive electrode.

[Negative Electrode Preparation]

95.6 parts by weight of artificial graphite as a negative electrode active material, 0.75 part by weight of carbon black as a conductive agent, and 3.65 parts by weight of carboxymethyl cellulose (CMC), as a binder, were mixed based on 100 parts by weight of a composition for forming a negative electrode and added to $H_2O$, as a solvent, to prepare the composition for forming a negative electrode. A 20 μm thick copper foil was coated with the composition for forming a negative electrode, dried, and then roll-pressed to prepare a negative electrode.

[Secondary Battery Preparation]

After the above-prepared positive electrode and negative electrode were stacked with a polyethylene separator to prepare an electrode assembly, the electrode assembly was put in a battery case, an electrolyte solution, in which 1.0 M $LiPF_6$ was dissolved in a mixed solvent prepared by mixing ethylene carbonate, propyl propionate, and diethyl carbonate in a weight ratio of 3:1:6, was injected thereinto to prepare a lithium secondary battery.

Example 2

A positive electrode and a lithium secondary battery including the same were prepared in the same manner as in Example 1 except that the first positive electrode active material and the second positive electrode active material were mixed in a weight ratio of 80:20.

Example 3

A positive electrode and a lithium secondary battery including the same were prepared in the same manner as in Example 1 except that the first positive electrode active material and the second positive electrode active material were mixed in a weight ratio of 90:10.

Example 4

A positive electrode and a lithium secondary battery including the same were prepared in the same manner as in Example 1 except that the first positive electrode active material and the second positive electrode active material were mixed in a weight ratio of 50:50.

Comparative Example 1

A positive electrode and a lithium secondary battery including the same were prepared in the same manner as in Example 1 except that 100% of the first positive electrode active material prepared in Example 1 was only included as a positive electrode material to prepare the positive electrode.

Comparative Example 2

A positive electrode and a lithium secondary battery including the same were prepared in the same manner as in Example 1 except that the precursor for a second positive electrode active material was dry-mixed with LiOH·H$_2$O, as a lithium raw material, (1.02 mol of the lithium raw material relative to 1 mol of the precursor) and sintering was then performed at 850° C. for 9 hours to prepare a second positive electrode active material in the form of a secondary particle, in which primary particles were agglomerated, during the preparation of the second positive electrode active material.

COMPARATIVE EXAMPLE

As a second positive electrode active material, NiSO$_4$, CoSO$_4$, and MnSO$_4$ were mixed in H$_2$O in amounts such that a molar ratio of nickel:cobalt:manganese was 50:20:30 to prepare a transition metal-containing solution.

The transition metal-containing solution was continuously added to a co-precipitation reactor at a rate of 180 mL/min, a NaOH aqueous solution and a NH$_4$OH aqueous solution were respectively added at rates of 180 mL/min and 10 mL/min, and a co-precipitation reaction was performed for 0.5 hours to precipitate particles of nickel manganese cobalt composite metal hydroxide. The particles of the precipitated nickel manganese cobalt-based composite metal-containing hydroxide were separated, washed, and then dried in an oven at 120° C. for 12 hours to prepare a precursor for a second positive electrode active material having an average particle diameter of 6 m in the form of a single particle.

A positive electrode and a lithium secondary battery including the same were prepared in the same manner as in Example 1 except that the precursor for a second positive electrode active material was used to prepare a second positive electrode active material in the form of a single particle.

Experimental Example 1: Identification of Structure of Second Positive Electrode Active Material A structure of each of the second positive electrode active materials prepared in Example 1 and Comparative Examples 2 and 3 was identified by using a scanning electron microscope, and the results thereof are presented in FIGS. 1 to 3.

It may be confirmed that the second positive electrode active material prepared in Example 1 was in the form of a single particle as illustrated in FIG. 1.

Figure 2:
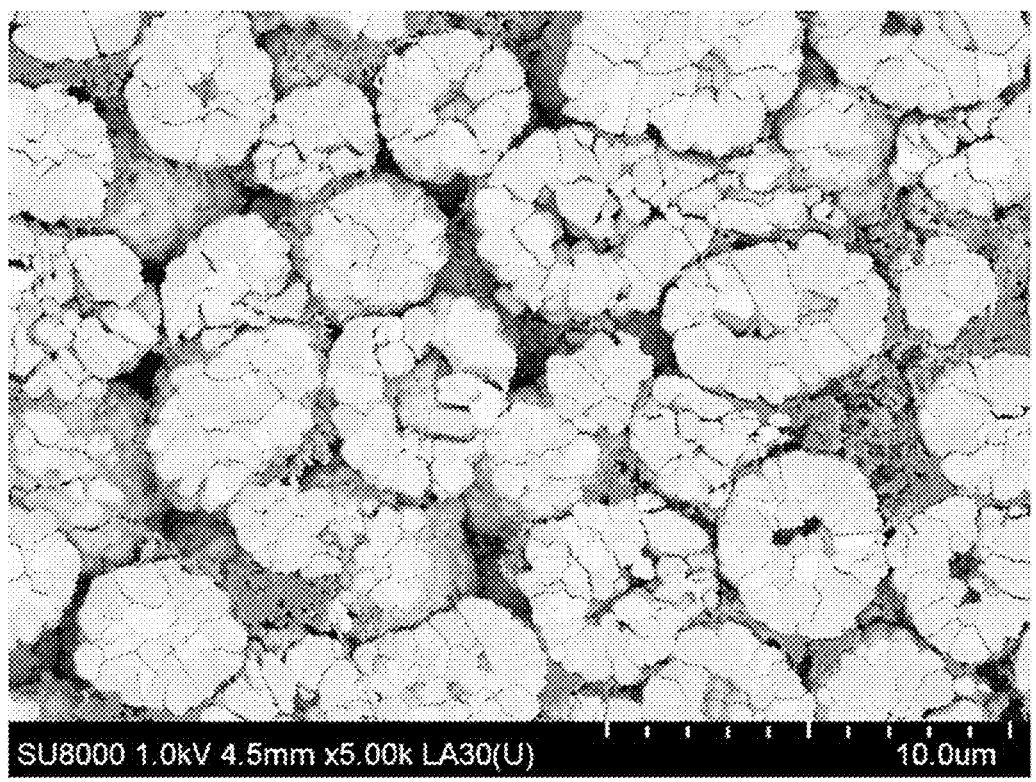
FIG. 2 is a high-magnification SEM image of a second positive electrode active material prepared in Comparative Example 2 of the present disclosure.

In contrast, with respect to the second positive electrode active material prepared in Comparative Example 2, since the precursor having a concentration gradient was used, but was sintered at 900° C. or less, it may be confirmed that the finally obtained second positive electrode active material was in the form of a secondary particle, in which primary particles were agglomerated, as illustrated in FIG. 2.

Figure 3:
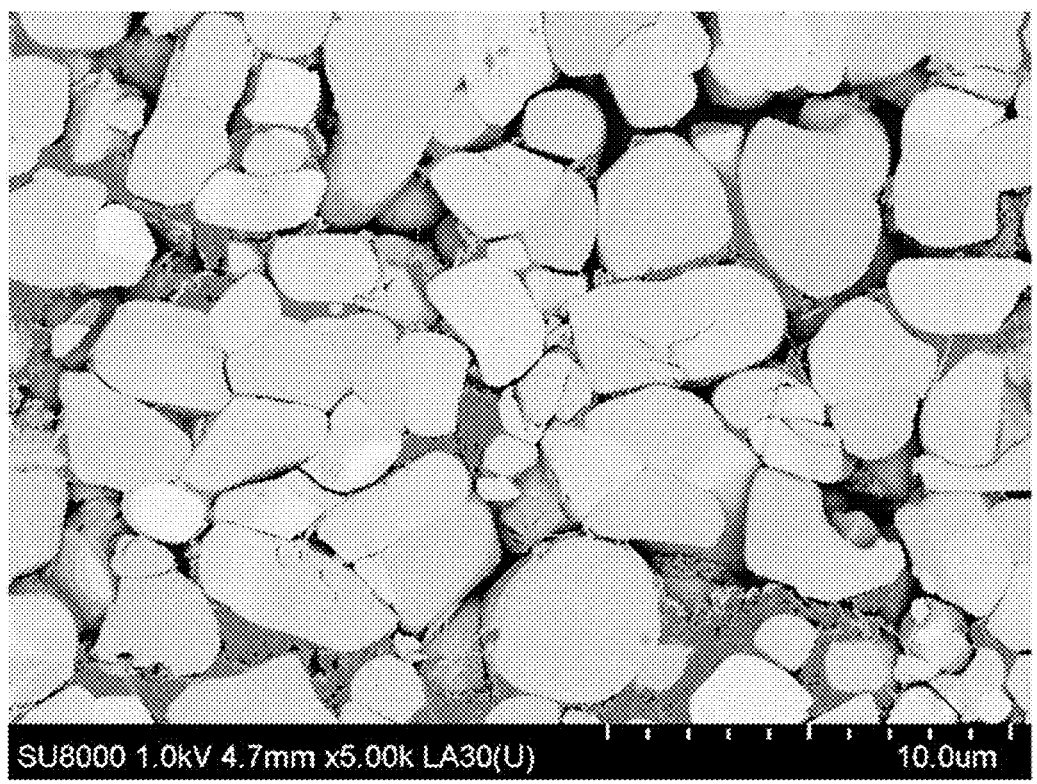
FIG. 3 is a high-magnification SEM image of a second positive electrode active material prepared in Comparative Example 3.

Also, with respect to the second positive electrode active material prepared in Comparative Example 3, since the precursor with no concentration gradient was used and sintered at 900° C. or more, it may be confirmed that the finally obtained second positive electrode active material was in the form of a single particle without a concentration gradient as illustrated in FIG. 3.

Figure 4:
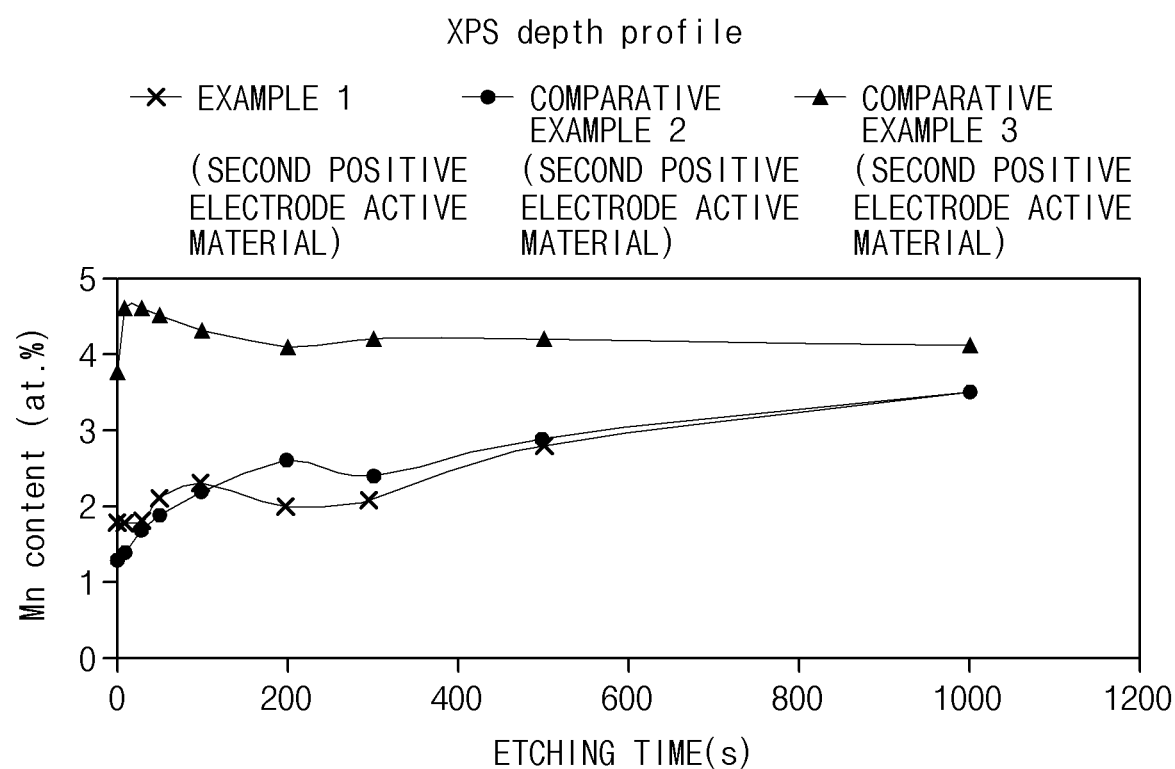
FIG. 4 is a graph illustrating X-ray photoelectron spectroscopy (XPS) depth profiles of second positive electrode active materials prepared in Example 1 and Comparative Examples 2 and 3.
Figure 5:
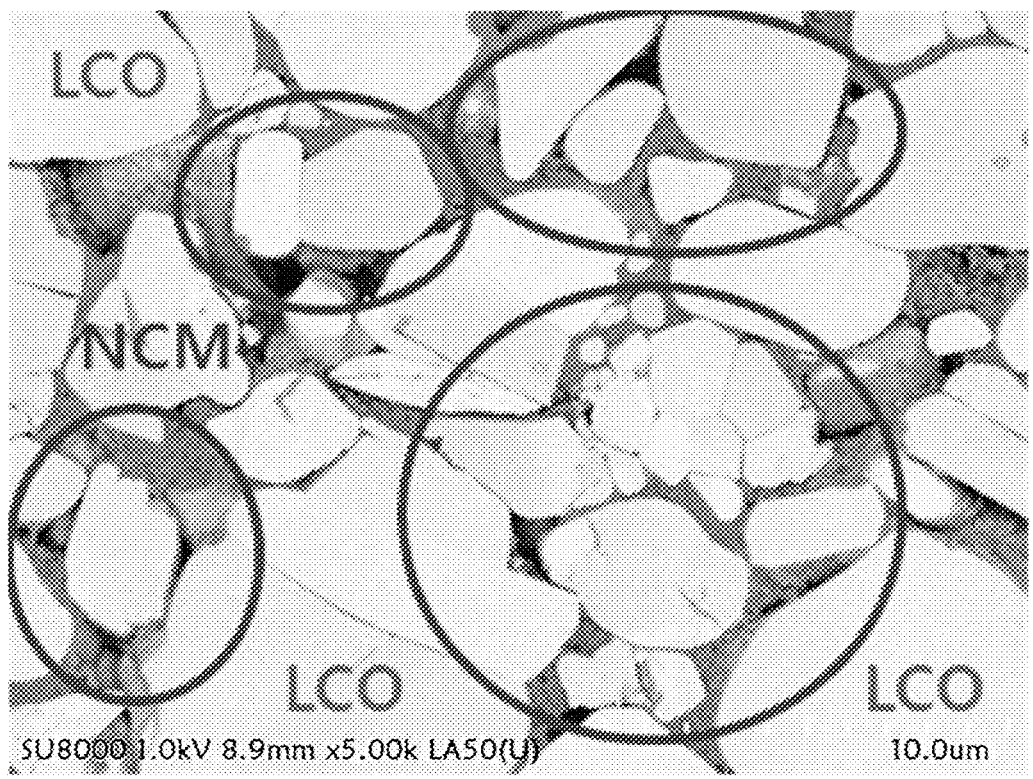
FIG. 5 is an SEM image of a positive electrode material prepared in Example 1 after rolling.
Figure 6:
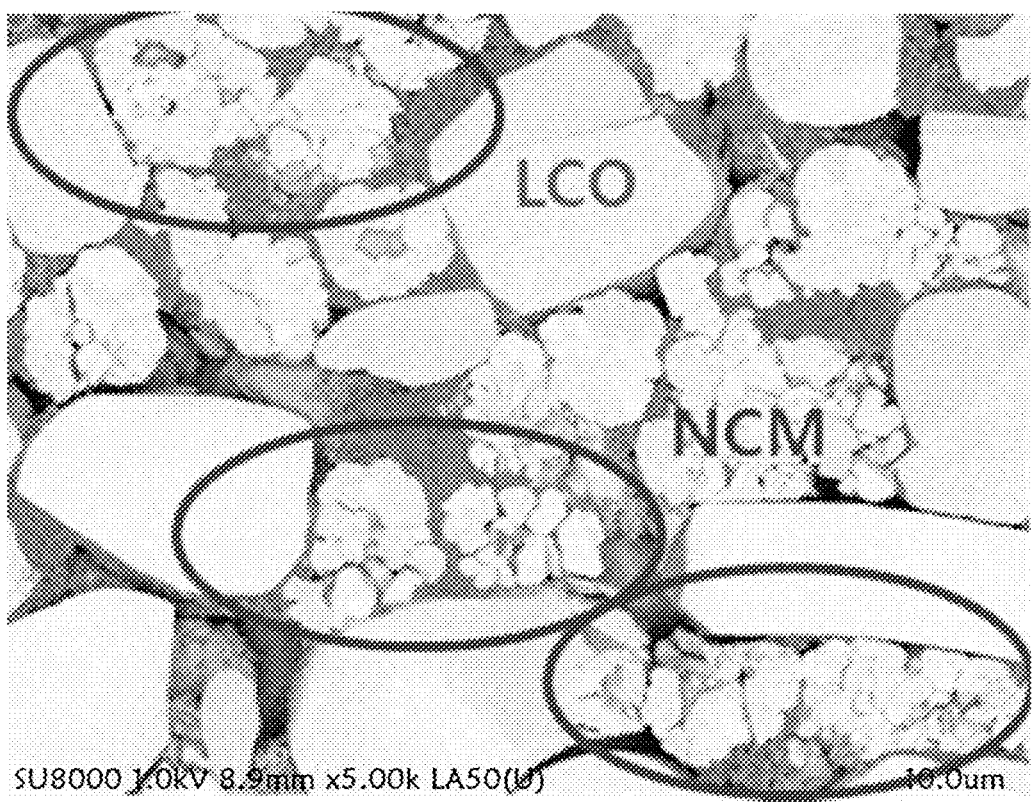
FIG. 6 is an SEM image of a positive electrode material prepared in Comparative Example 2 after rolling.

In addition, concentration gradients of the second positive electrode active materials prepared in Example 1 and Comparative Examples 2 and 3 may be confirmed by a depth profile using X-ray photoelectron spectroscopy (XPS). Specifically, after the second positive electrode active material particles prepared in Example 1 and Comparative Examples 2 and 3 were introduced into a chamber in a vacuum state, a surface of each positive electrode active material according to etching time was confirmed while the second positive electrode active material particles were etched using an Ar beam, and the results thereof are presented in FIG. 4. As illustrated in FIG. 4, with respect to the second positive electrode active materials prepared in Example 1 and Comparative Example 2, it may be confirmed that an amount of manganese was increased as the etching time was increased. That is, with respect to the second positive electrode active materials prepared in Example 1 and Comparative Example 2, it may be understood that the amount of manganese was gradually increased from the surface of the particle to the center thereof. In contrast, with respect to the second positive electrode active material prepared in Comparative Example 3, it may be confirmed that the amount of manganese was constant from the surface of the particle to the center thereof and a concentration gradient was not present. A positive collector was coated with a composition for forming a positive electrode including each of the positive electrode materials prepared in Example 1 and Comparative Example 2, and then pressed at a rolling density of 3.70 g/cc. As illustrated in FIG. 5, with respect to the positive electrode material of Example 1 including the second positive electrode active material which was in the form of a single particle and had a concentration gradient in which the amount of manganese was gradually decreased from the center of the particle to the surface thereof, cracks were not observed in the second positive electrode active material after rolling. However, as illustrated in FIG. 6, with respect to the positive electrode material of Comparative Example 2 including the second positive electrode active material which was not in the form of a single particle and had a concentration gradient in which the amount of manganese was gradually decreased from the center of the particle to the surface thereof, cracks were observed in the second positive electrode active material after rolling.

Experimental Example 2: Identification of Surface Properties of Positive Electrode Material Surface properties of each of the positive electrode materials prepared in Example 1 and Comparative Example 2 were identified by using a scanning electron microscope.

Figure 7:
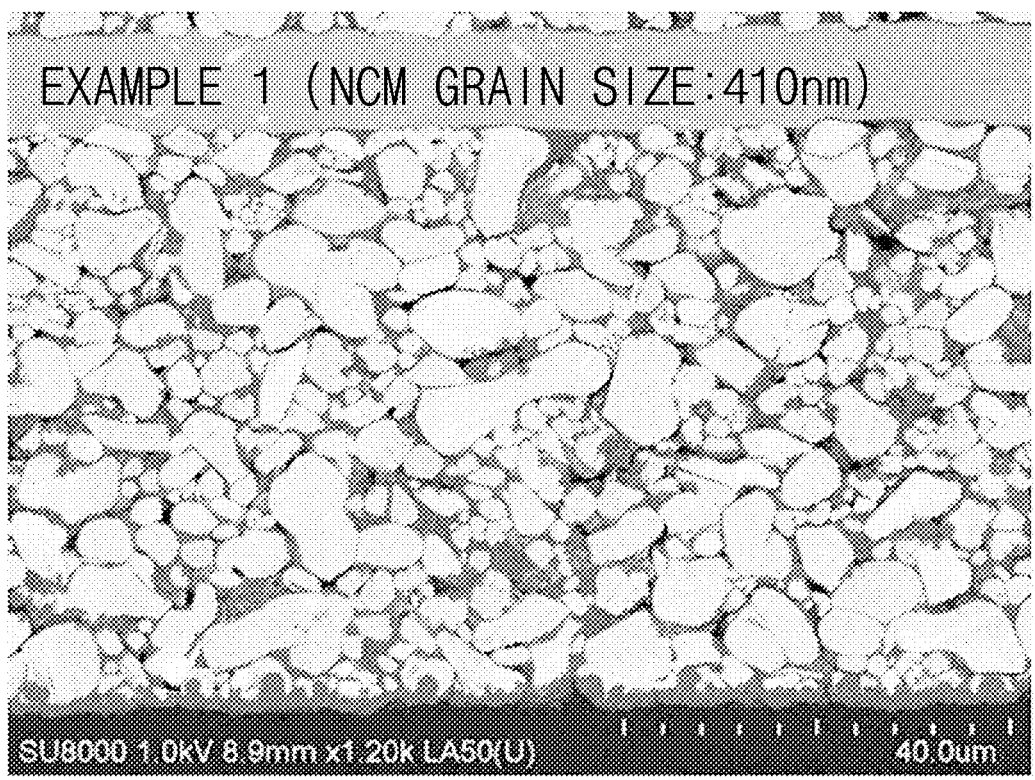
FIG. 7 is a low-magnification SEM image of the positive electrode material prepared in Example 1 of the present disclosure.
Figure 8:
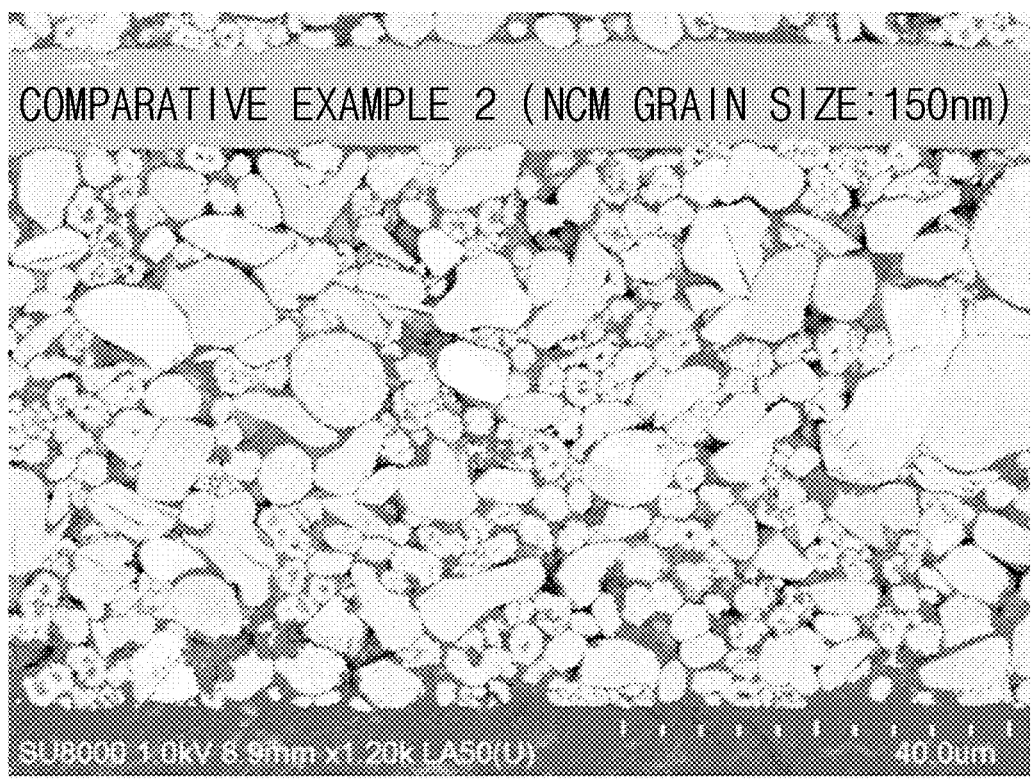
FIG. 8 is a low-magnification SEM image of the positive electrode material prepared in Comparative Example 2 of the present disclosure.

As illustrated in FIGS. 7 and 8, it may be confirmed that, with respect to the positive electrode material prepared in Example 1, a grain size of the second positive electrode active material was about 410 nm, and, with respect to the positive electrode material prepared in Comparative Example 2, a grain size of the second positive electrode active material was about 150 nm. Also, it may be confirmed that the first positive electrode active material and the second positive electrode active material were uniformly mixed.

With respect to Example 1, since the second positive electrode active material was over-sintered at a temperature of 990° C. during the preparation of the second positive electrode active material, the grain size of the second positive electrode active material was increased due to an increase in sintering effect between grains.

A positive collector was coated with the composition for forming a positive electrode including each of the positive electrode materials prepared in Example 1 and Comparative Example 2, and then pressed at a rolling density of 3.70 g/cc. With respect to Example 1, cracks were not observed in the second positive electrode active material. However, with respect to Comparative Example 2, cracks were observed in the second positive electrode active material. It was considered that, in a case in which the grain size of the second positive electrode active material was increased due to the over-sintering at 990° C. as in Example 1, since both tap density and pellet density were increased while a volume of pores between the particles was reduced, high rolling density may be achieved, and, accordingly, energy density per volume may also be improved.

Experimental Example 3: Battery Characteristics Evaluation

Battery characteristics of the lithium secondary batteries prepared in Examples 1 and 2 and Comparative Examples 1 to 3 were evaluated.

Specifically, in order to find out an amount of lithium impurities of each of the second positive electrode active materials prepared in Examples 1 and 2 and Comparative Examples 1 to 3, pH titration was performed. Metrohm was used as a pH meter and pH was recorded after every 1 mL of titration. Specifically, the amount of the lithium impurities on the surface of the second positive electrode active materials was measured by titrating a solution, in which 5±0.01 g of 0.1 N HCl and 100 g of distilled water were stirred for 5 minutes and filtered, using a Metrohm pH meter until the pH drops to 4 or less, and the results thereof are presented in Table 1 below.

Each of the lithium secondary batteries prepared in Examples 1 and 2 and Comparative Examples 1 to 3 was charged at a constant current of 0.2 C to 4.35 V, and then stored at 60° C. for 20 days. Changes in open-circuit voltage immediately after the charging of the lithium secondary batteries prepared in Examples 1 and 2 and Comparative Examples 1 to 3 and after the storage for 20 days were observed, swelling characteristics were calculated based on a change in thickness before/after the storage of the lithium secondary batteries, and the results thereof are presented in Table 1 below.

TABLE 1

| | Residual Li amount on surface of second positive electrode active material (%) | Thickness (mm) Before storage | Thickness (mm) After storage | Swelling (%) |
|---|---|---|---|---|
| Example 1 | 0.08 | 4.21 | 4.34 | 3.2 |
| Example 2 | 0.08 | 4.19 | 4.32 | 3.1 |
| Comparative Example 1 | — | 4.22 | 4.35 | 3.0 |
| Comparative Example 2 | 0.19 | 4.19 | 4.74 | 13.2 |
| Comparative Example 3 | 0.09 | 4.20 | 4.35 | 3.5 |

Figure 9:
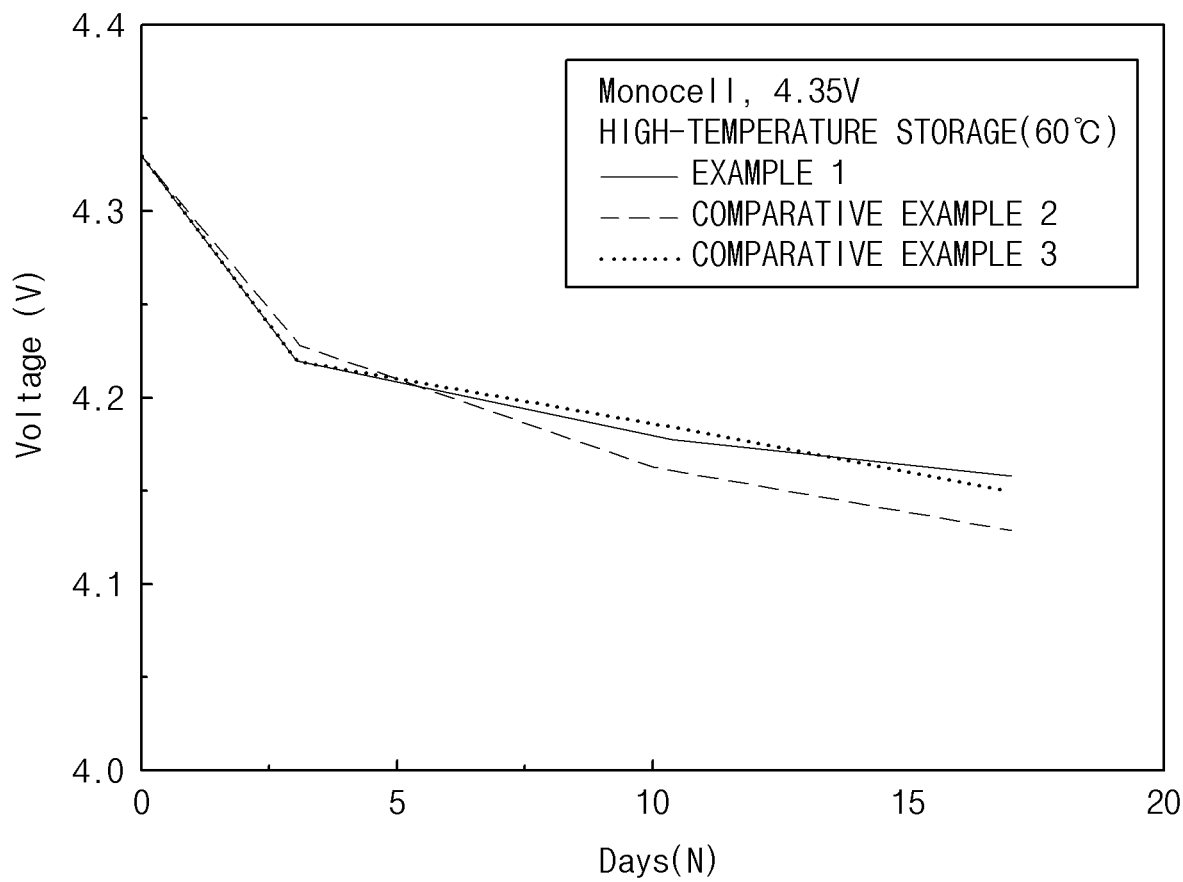
FIG. 9 illustrates changes in open-circuit voltage of lithium secondary batteries prepared in Example 1 and Comparative Examples 2 and 3 with high-temperature storage time.

In this regard, FIG. 9 illustrates changes in open-circuit voltage of the lithium secondary batteries prepared in Example 1 and Comparative Examples 2 and 3 with high-temperature storage time. As illustrated in FIG. 9, it may be confirmed that open-circuit voltage drop rate of the lithium secondary batteries prepared in Comparative Examples 2 and 3 was larger than that of Example 1, and, accordingly, it may be confirmed that high-temperature storage performance of the lithium secondary batteries prepared in Comparative Examples 2 and 3 was inferior to that of Example 1. The reason for this was that, with respect to the lithium secondary battery prepared in Example 1, since the second positive electrode active material was over-sintered at a temperature of 900° C. or more during the preparation of the second positive electrode active material, the amount of the lithium impurities on the surface of the second positive electrode active material was significantly reduced in comparison to that of Comparative Example 2, and, as a result, stability of the surface of the second positive electrode active material was improved.

Also, as illustrated in Table 1, with respect to the lithium secondary batteries prepared in Examples 1 and 2, since the amount of the residual lithium impurities on the surface of the second positive electrode active material was very low, and, accordingly, the side reaction between the electrolyte solution and the residual lithium impurities on the surface of the second positive electrode active material was reduced, it may be confirmed that swelling was also small.

However, in a case in which sintering was performed at a temperature of 900° C. or less during the preparation of the second positive electrode active material particularly as in Comparative Example 2, since the amount of the residual lithium impurities on the surface of the second positive electrode active material was about 2.4 times higher than that of Example 1, and, accordingly, the side reaction between the electrolyte solution and the positive electrode material occurred during charge and discharge of the battery, swelling was also large.

Experimental Example 4: Fast Charging Test

Tests for measuring fast charging performances of the lithium secondary batteries prepared in Examples 1 to 4 and Comparative Examples 1 to 3 were performed.

Specifically, each of the lithium secondary batteries prepared in Examples 1 to 4 and Comparative Examples 1 to 3 was charged at a constant current of 1.0 C to 4.35 V at 25° C. and cut-off charged at 0.05 C, and time required to reach a SOC of 80% was measured.

The following Table 2 is a table in which the fast charging times required for the lithium secondary batteries prepared in Examples 1 to 4 and Comparative Examples 1 to 3 to reach a SOC of 80% at 1.0 C were compared.

TABLE 2

|  | Time required to reach a SOC of 80% (minutes) |
| --- | --- |
| Example 1 | 63 |
| Example 2 | 69 |
| Example 3 | 73 |
| Example 4 | 53 |
| Comparative Example 1 | 86 |
| Comparative Example 2 | 59 |
| Comparative Example 3 | 71 |

As illustrated in Table 2, it may be confirmed that the charge time at 1.0 C of Example 1, in which the lithium cobalt oxide and the lithium nickel cobalt manganese oxide were mixed, was reduced by about 25% or more in comparison to that of Comparative Example 1. This was considered because a charge rate of the lithium nickel cobalt manganese oxide was better than that of the lithium cobalt oxide. Also, the fast charging performance of Comparative Example 3 was about 10% lower than that of Example 1, and the reason for this was that, since Comparative Example 3 included the second positive electrode active material without a concentration gradient, output characteristics of the positive electrode material were reduced.

Comparative Example 2 exhibited excellent fast charging performance because the second positive electrode active material had a concentration gradient. However, with respect to Comparative Example 2, since the swelling performance during high-temperature storage measured in Experimental Example 3 was inferior to that of Example 1, it was considered that it would be difficult for Comparative Example 2 to be used in an actual battery.

The invention claimed is:

1. A positive electrode material comprising:
a first positive electrode active material represented by Formula 1; and
a second positive electrode active material in a form of a single particle and represented by Formula 2,
wherein an amount of lithium impurities on a surface of the second positive electrode active material is 0.14 wt % or less based on a total weight of the second positive electrode active material, and
at least one of nickel (Ni), cobalt (Co), and manganese (Mn) included in the second positive electrode active material has a concentration gradient gradually changing from a center of the particle to a surface thereof:

$LiCo_{1-a}M^1_aO_2$ [Formula 1]

$LiNi_bCo_cMn_dM^2_eO_2$ [Formula 2]

wherein, in Formula 1, $M^1$ comprises at least one selected from the group consisting of aluminum (Al), titanium (Ti), magnesium (Mg), and zirconium (Zr), and $0 \le a \le 0.2$, and
wherein, in Formula 2, $M^2$ comprises at least one selected from the group consisting of Al, Ti, Mg, Zr, yttrium (Y), strontium (Sr), and boron (B), and $0 < b \le 0.6$, $0 < c \le 0.35$, $0 < d \le 0.35$, and $0 \le e \le 0.1$,
wherein Mn included in the second positive electrode active material has a concentration gradient gradually decreasing from the center of the particle to the surface thereof.

2. The positive electrode material of claim 1, wherein the first positive electrode active material and the second positive electrode active material are included in a weight ratio of 40:60 to 90:10.

3. The positive electrode material of claim 1, wherein the first positive electrode active material has an average particle diameter ($D_{50}$) of 10 μm or more.

4. The positive electrode material of claim 1, wherein the second positive electrode active material has an average particle diameter ($D_{50}$) of 5 μm to 10 μm.

5. The positive electrode material of claim 1, wherein the second positive electrode active material has a grain size of 200 nm to 500 nm.

6. A positive electrode for a lithium secondary battery, the positive electrode comprising the positive electrode material of claim 1.

7. A lithium secondary battery comprising the positive electrode of claim 6.

8. A method of preparing a positive electrode material, the method comprising:
preparing a first positive electrode active material represented by Formula 1 by mixing and sintering a cobalt oxide, a lithium-containing raw material, and a doping element $M^1$-containing raw material;
preparing a second positive electrode active material in a form of a single particle, which is represented by Formula 2, by sintering a nickel cobalt manganese hydroxide precursor having a core-shell structure and a lithium-containing raw material at 900° C. or more; and
mixing the prepared first positive electrode active material and the prepared second positive electrode active material,
wherein at least one of nickel, cobalt, and manganese in the second positive electrode active material has a concentration gradient gradually changing from a center of the particle to a surface thereof:

$LiCo_{1-a}M^1_aO_2$ [Formula 1]

$LiNi_bCo_cMn_dM^2_eO_2$ [Formula 2]

wherein, in Formula 1,
$M^1$ comprises at least one selected from the group consisting of aluminum (Al), titanium (Ti), magnesium (Mg), and zirconium (Zr), and $0 \le a \le 0.2$, and
wherein, in Formula 2,
$M^2$ comprises at least one selected from the group consisting of Al, Ti, Mg, Zr, yttrium (Y), strontium (Sr), and boron (B), and $0 < b \le 0.6$, $0 < c \le 0.35$, $0 < d \le 0.35$, and $0 \le e \le 0.1$.

9. The method of claim 8, wherein an average composition of the nickel cobalt manganese hydroxide precursor is represented by Formula 3:

$Ni_{b1}Co_{c1}Mn_{d1}(OH)_2$ [Formula 3]

wherein, in Formula 3,
$0 < b1 \le 0.6$, $0 < c1 \le 0.35$, and $0 < d1 \le 0.35$.

10. The method of claim 8, further comprising a step of preparing the nickel cobalt manganese hydroxide precursor including:
preparing a first transition metal-containing solution including nickel, cobalt, and manganese and a second transition metal-containing solution including nickel, cobalt, and manganese in a concentration different from that of the first transition metal-containing solution; and mixing the first transition metal-containing solution and the second transition metal-containing solution such that a mixing ratio of the first transition metal-containing solution and the second transition metal-containing solution is gradually changed from 100 vol %:0 vol % to 0 vol %: 100 vol % and adding an ammonium ion-containing solution and a basic aqueous solution at a same time, wherein at least one of the nickel, the cobalt, and the manganese has a concentration gradient gradually changing from the center of the particle to the surface thereof.

11. The method of claim 8, wherein the first positive electrode active material and the second positive electrode active material are mixed in a weight ratio of 40:60 to 90:10.

* * * * *